(12) United States Patent
Woo et al.

(10) Patent No.: US 11,282,113 B2
(45) Date of Patent: Mar. 22, 2022

(54) TECHNIQUES FOR INTELLIGENCE USING CONNECTED VEHICLE DATA

(71) Applicant: Ford Global Technologies, LLC, Dearborn, MI (US)

(72) Inventors: Jason Joseph Woo, Northville, MI (US); Jeremy Lerner, Southfield, MI (US); Jae Hyung Lim, Canton, MI (US); Taylor Hawley, Dearborn, MI (US); Joseph Gifford, Ferndale, MI (US)

(73) Assignee: Ford Global Technologies, LLC, Deerborn, MI (US)

( * ) Notice: Subject to any disclaimer, the term of this patent is extended or adjusted under 35 U.S.C. 154(b) by 241 days.

(21) Appl. No.: 16/735,151

(22) Filed: Jan. 6, 2020

(65) Prior Publication Data
US 2021/0209648 A1 Jul. 8, 2021

(51) Int. Cl.
| | | |
|---|---|---|
| *G06Q 30/02* | (2012.01) | |
| *H04W 4/38* | (2018.01) | |
| *G07C 5/00* | (2006.01) | |
| *G07C 5/08* | (2006.01) | |
| *H04W 4/40* | (2018.01) | |
| *H04W 4/46* | (2018.01) | |
| *H04W 4/021* | (2018.01) | |

(52) U.S. Cl.
CPC ......... *G06Q 30/0269* (2013.01); *G07C 5/008* (2013.01); *G07C 5/085* (2013.01); *H04W 4/021* (2013.01); *H04W 4/38* (2018.02); *H04W 4/40* (2018.02); *H04W 4/46* (2018.02)

(58) Field of Classification Search
None
See application file for complete search history.

(56) References Cited

U.S. PATENT DOCUMENTS

| | | | |
|---|---|---|---|
| 9,240,018 B2 | 1/2016 | Ricci | |
| 9,710,821 B2 | 7/2017 | Heath | |
| 10,026,237 B1 | 7/2018 | Fields et al. | |
| 10,318,963 B1* | 6/2019 | Prasad | G06Q 30/018 |
| 10,726,723 B1* | 7/2020 | Madden | G07B 15/04 |
| 10,783,559 B1* | 9/2020 | Tran | G06K 9/00845 |
| 2009/0199230 A1* | 8/2009 | Kumar | G06Q 30/0268 |
| | | | 725/32 |

(Continued)

*Primary Examiner* — Muhammad Adnan
(74) *Attorney, Agent, or Firm* — Brandon Hicks; Kilpatrick Townsend & Stockton LLP

(57) ABSTRACT

Vehicle manufacturers may leverage one vehicle of a household to gain intelligence to determine whether a new vehicle may be purchased or an existing vehicle may be replaced for the household. Techniques include identifying a home geofence space that identifies the household at the household address for the vehicle. The sensor data from the vehicle can be used to identify other vehicles within the home geofence space. When other vehicles are identified that match appropriate criteria, the other vehicles may be associated with the household. Further observation of the other vehicles and the behavior of the members of the household can be used to identify when an existing vehicle of the household may be replaced and/or a new vehicle may be purchased. Upon determining that a new or replacement vehicle may be purchased, marketing materials may be provided to the household to aid the household with purchasing the new vehicle.

16 Claims, 7 Drawing Sheets

(56) References Cited

U.S. PATENT DOCUMENTS

| | | | |
|---|---|---|---|
| 2012/0310713 A1* | 12/2012 | Mercuri | G06Q 30/0207 |
| | | | 705/14.1 |
| 2013/0321178 A1* | 12/2013 | Jameel | H04W 4/029 |
| | | | 340/989 |
| 2014/0032268 A1* | 1/2014 | Kruglick | G06Q 50/10 |
| | | | 705/7.31 |
| 2014/0180773 A1 | 6/2014 | Zafiroglu et al. | |
| 2016/0343010 A1* | 11/2016 | East, III | G06Q 10/20 |
| 2018/0074034 A1* | 3/2018 | Jones | G06Q 30/02 |
| 2020/0074497 A1* | 3/2020 | Miller | G06Q 30/0272 |
| 2020/0394667 A1* | 12/2020 | Kawashima | G06N 5/003 |

\* cited by examiner

TECHNIQUES FOR INTELLIGENCE USING CONNECTED VEHICLE DATA

BACKGROUND

In modern days, most households own or lease at least one vehicle. Particularly in rural and suburban areas, it is not feasible for a consumer to solely use public transportation. For a vehicle manufacturer, it may be valuable to know whether a household may be ready to purchase a new vehicle or replace a vehicle. However, it is difficult to obtain such intelligence information. Consumers buy new vehicles for many reasons including that their family is growing, an existing car is old, damaged, or experiencing functional issues, or a child is reaching driving age, among other reasons. Currently, solutions have not identified a practical way for a manufacturer to determine when a consumer may purchase a new vehicle or replace an existing one.

SUMMARY

In some embodiments, techniques for identifying a home geofence space of a vehicle are used in conjunction with sensor data of the vehicle to further identify additional vehicles of the household. In some embodiments, a system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a computer-implemented method that includes determining a home geofence space for a first vehicle, where the home geofence space and the first vehicle are associated with a household. The household may include a family with one or more members. The computer system may receive sensor data from the first vehicle that is captured using a sensor on the first vehicle while the first vehicle is within the home geofence space. For example, the sensor data may be collected using a sensor on the first vehicle when the vehicle is parked at home in the garage, driveway, or in the street near the household's home address. Using the sensor data, a second vehicle may be identified within the home geofence space. The second vehicle may be associated with the household based on the sensor data. Other embodiments of this aspect include corresponding computer systems, apparatus, and computer programs recorded on one or more computer storage devices, each configured to perform the actions of the methods.

Implementations may include one or more of the following features. Optionally, the sensor of the first vehicle includes a vison sensor (e.g., a camera). Optionally, the sensor of the first vehicle includes a transceiver communicating with the second vehicle using vehicle-to-vehicle communication. Optionally, associating the second vehicle with the household includes determining that the second vehicle belongs to the household based on the length of time the second vehicle was detected within the home geofence space, the times of day the second vehicle was detected within the home geofence space, or the number of times the second vehicle was detected within the home geofence space during a predetermined period of time (e.g., two weeks). Optionally, determining the home geofence space includes detecting a location of the first vehicle using a global positioning system (GPS) of the first vehicle in a pattern that corresponds to a home location pattern. Optionally, the home geofence space is determined using satellite images to map the home geofence space to include a driveway of the home address of the household. Optionally, the home geofence space is determined based at least in part on parking usage in the geographic region of the household (e.g., suburban, urban, rural, multi-tenant housing, and the like). Optionally, the method further includes determining, using the sensor data, the make of the second vehicle, the model of the second vehicle, the condition of the second vehicle, or a unique identifier of the second vehicle. Optionally, the method further includes identifying, based on the sensor data, an indication that the second vehicle may be replaced within a predetermined period of time (e.g., less than one month, less than 3 months, less than six months, or the like). In response to determining the second vehicle may be replaced soon, providing marketing materials to the household for replacing the second vehicle. Implementations of the described techniques may include hardware, a method or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

As discussed above, it is difficult to know when a household may decide to add or upgrade a vehicle. Manufacturers of newer vehicles have sensor data available that can be utilized to determine in a household having one of their vehicles whether the vehicle or another household vehicle is likely to be replaced in the near future (e.g., three months, six months, etc.). Further, this sensor data may be used to identify if a new vehicle may be purchased. For example, sensor data from the vehicle vision devices may be used to identify other vehicles in the household that may be damaged or otherwise in need of repair or replacement. Such insights may trigger targeted marketing to the household to offer incentives or other information for purchasing a new vehicle from the manufacturer.

Figure 1:
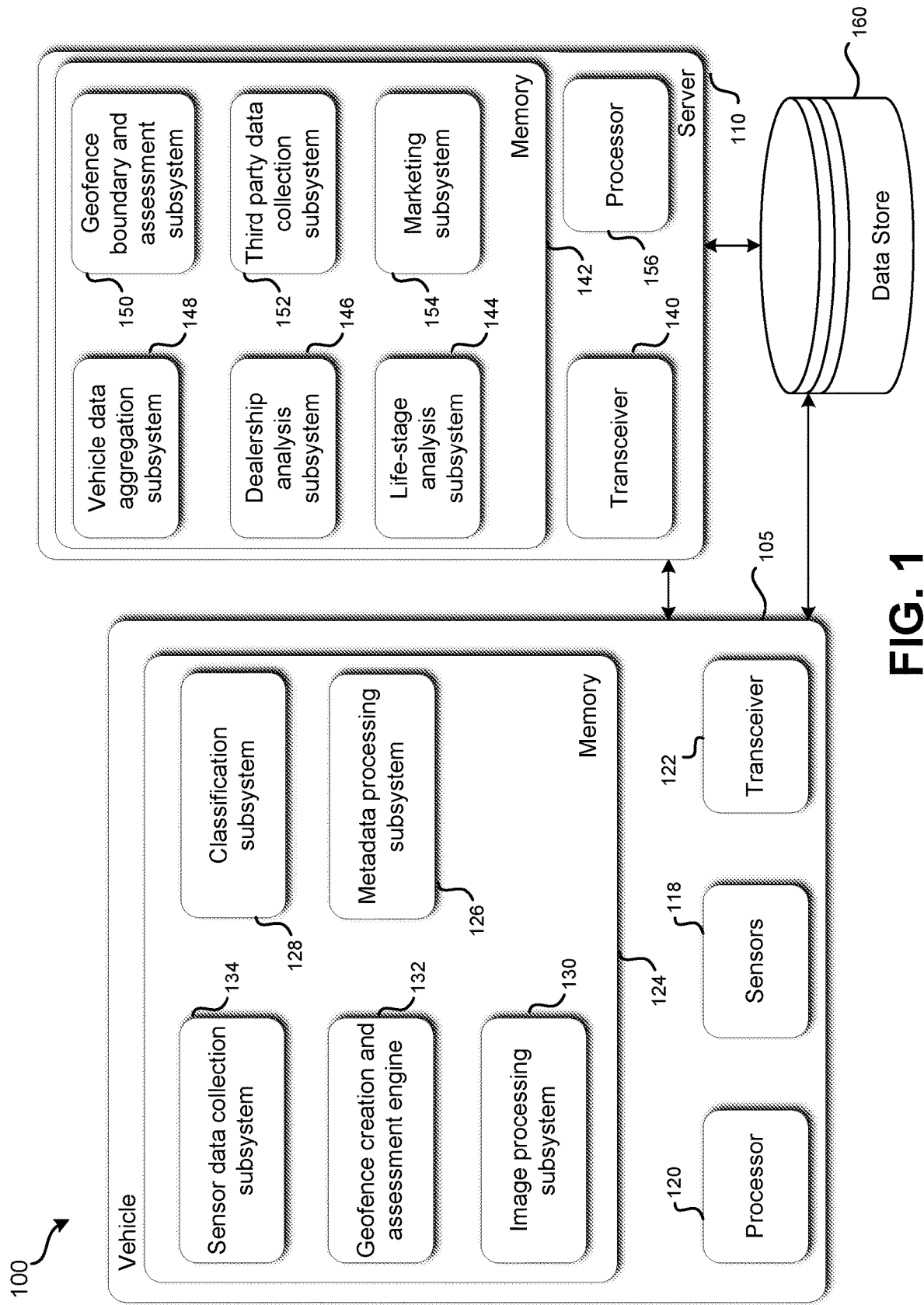
FIG. 1 illustrates an intelligence system, according to some embodiments.

Turning to FIG. 1, an exemplary intelligence system 100 is depicted. The intelligence system 100 includes a vehicle 105 and a server 110. Intelligence system 100 may be used to gather information about the household and vehicles of the owner of vehicle 105 to determine if and when the household may purchase or replace a vehicle.

Vehicle 105 includes sensors 118, processor 120, transceiver 122, and memory 124. The processor 120 may execute instructions stored in memory 124 to perform the described functionality herein. Transceiver 122 may send and receive information to and from, for example, transceiver 140 of server 110 using any suitable protocol. While only specific components of vehicle 105 are described herein, vehicle 105 includes many other components left out of this description for simplicity. For example, vehicle 105 includes components for driving such as tires, a drivetrain, an engine, and the like. Vehicle 105 may further include other components, subsystems, or instructions in memory 124 that are left out for simplicity of description of the functionality described herein.

Sensors 118 may include any sensors that may be used for gathering information about the vehicle 105 or its surroundings. For example, a tire pressure sensor, interior and exterior cameras such as a backup camera, and transceivers for receiving vehicle to vehicle (V2V) communications are all types of sensors that may be used to gather information about vehicle 105 and the surroundings. Advanced Driver Assistance Systems (ADAS) includes cameras (i.e., vision) within the vehicle 105 and on the exterior of the vehicle 105 to view the interior of the vehicle 105 and the exterior surroundings of the vehicle 105.

Memory 124 may include sensor data collection subsystem 134, geofence creation and assessment engine 132, image processing subsystem 130, classification subsystem 128, and metadata processing subsystem 126. While certain subsystems are described herein for ease of description, memory 124 may include more or fewer subsystems to perform the functionality described herein. Further, some of the data processing described, such as image processing or metadata processing may be performed on vehicle 105 or the raw data may be sent to server 110 for processing, or some combination thereof.

Sensor data collection subsystem 134 may collect the data captured by sensors 118. For example, sensors 118 may include a global positioning system (GPS), vision systems (e.g., cameras), and vehicle function sensors (e.g., tire pressure sensor, check engine light, ignition event, and so forth). The data from the sensors 118 and vehicle functioning are collected by sensor data collection subsystem 134 and provided to the appropriate processing subsystem for processing and analysis.

Geofence creation and assessment engine 132 may create a home geofence space for the vehicle 105 and assess whether the vehicle 105 is within the home geofence space or not. For example, geofence creation and assessment engine 132 may use sensor data from sensor data collection subsystem 134 to create the home geofence space for the vehicle 105 and associate it with a household. In some embodiments, the home address for the vehicle 105 is known from the manufacturer database from when the user purchases the vehicle 105. In some embodiments, the user (i.e., vehicle owner) may input their home address in a navigation system of the vehicle 105. In some embodiments, the user's mobile telephone may be connected to vehicle 105 via wireless or wired connection, and the user's mobile telephone may have a home address that is shared with vehicle 105. In some embodiments, the home location for the vehicle 105 is determined by geofence creation and assessment engine 132 based on user behavior and sensor data. For example, the vehicle location information from a GPS of the vehicle 105 in combination with ignition events and time of day information may be used to identify when the vehicle is at home. For example, if the vehicle 105 is parked in the same vicinity every night, this may indicate a home location. Accordingly, ignition events from sensors 118 and geographical information from a GPS may be used to model the data and identify patterns to determine the location is a home location based on a corresponding home location pattern. Because people having different working behaviors (e.g., night shifts and the like), more than one home location pattern model may be generated and compared with the pattern data from the vehicle 105 to identify the home location. Further, information about the vicinity may be used to eliminate various locations as a home address. For example, an airport or an industrial area may be excluded from home location possibilities based on GPS and map information. The GPS data may be used with reverse geocoding to identify the vehicle 105 home address.

Once the vehicle 105 home address is known, the home geofence space may be generated and associated with the vehicle to the home address and household information such as the owner's name or family name. The associated information may be stored, for example, in data store 160 as well as in memory 124 of vehicle 105. In some embodiments, the family name or owner name may be identified based on a reverse lookup or a third party application such as a real estate home ownership information database. In some embodiments, the process for establishing or checking home geofence space may be repeated periodically to check whether the vehicle 105 is still associated with the same household or if the household has moved addresses. Further, the geofence creation and assessment engine 132 may validate the stored information using information from multiple sources (e.g., sensor data, manufacturer database, reverse lookup, and the like).

Figure 3:
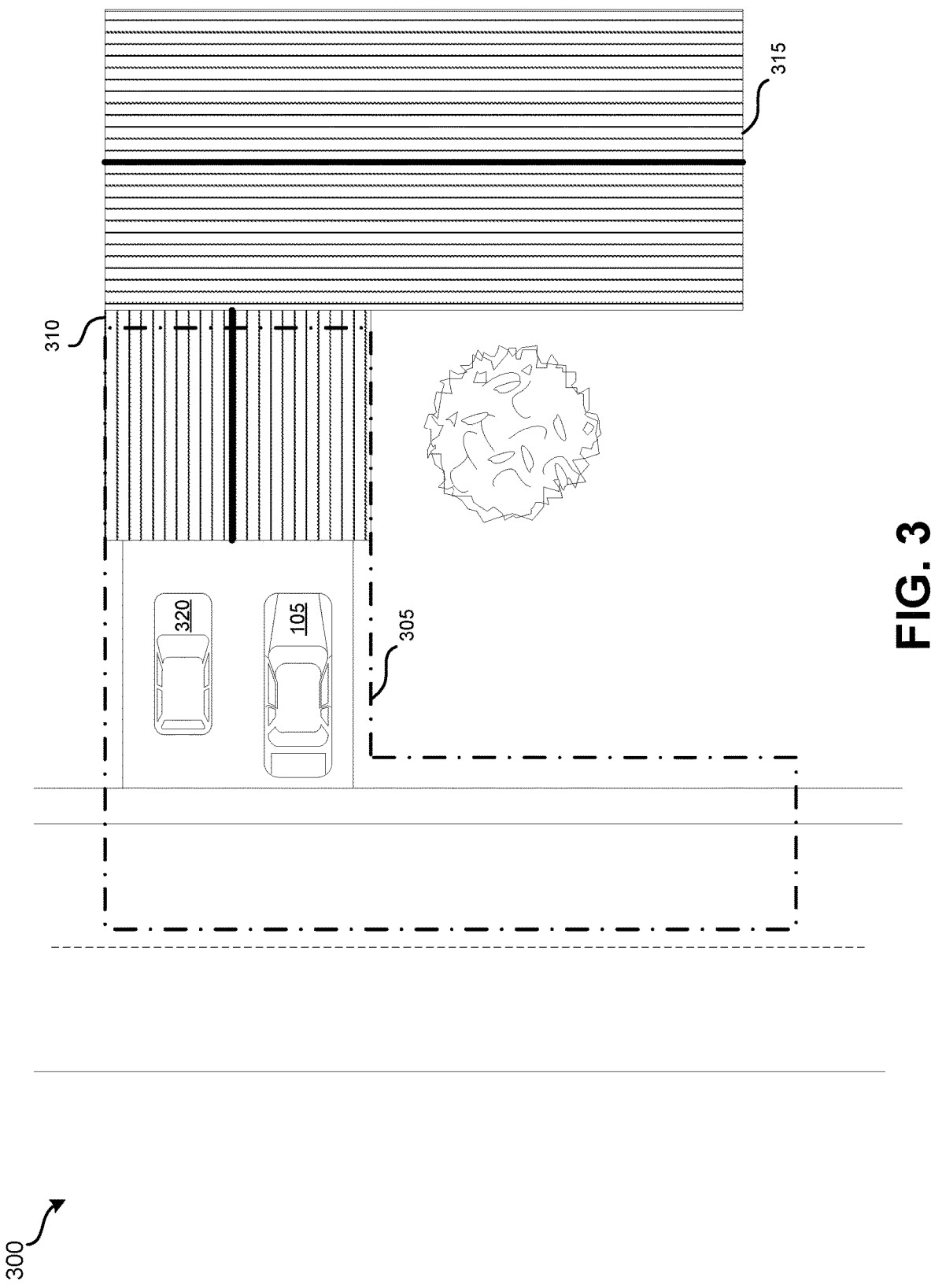
FIG. 3 illustrates a home geofence space, according to some embodiments.

The geofence creation and assessment engine 132 may further generate the home geofence space. A geofence is an imaginary boundary that, when applied to a mobile device or vehicle, can be determined whether the mobile device or vehicle 105 is within or outside the geofence. The geofence creation and assessment engine 132 can determine the home geofence space based on the home address information. In some embodiments, for example, a square area of 100-by-100 feet may be placed at the home address location as the home geofence space. In some embodiments, satellite imaging may be used to identify the home geofence space based on the home address or geographic coordinates from the GPS information. The satellite imaging may be used to map a home geofence space that extends, for example, to include the garage of the home address out to the middle of the street in front of the home address. FIG. 3 depicts an exemplary home geofence space 305.

The geofence creation and assessment engine 132 may further assess whether the vehicle 105 is within or outside the home geofence space. The determination of whether the vehicle is within or outside the home geofence space is used to determine whether to capture sensor 118 data for use and for other determinations as described further herein.

Once the home geofence space is determined, and the geofence creation and assessment engine 132 determines that the vehicle 105 is within the home geofence space, the sensor data collection subsystem 134 may further collect sensor 118 data for determining information about the vehicle 105 as well as other vehicles the household may own. For example, the sensor data collection subsystem 134 may capture data about surrounding vehicles within the home geofence space. Using pattern matching of the behavior, such as that the same vehicle is always parked next to vehicle 105 in the driveway of the household, an association may be generated that the second vehicle is another vehicle of the household. The information from sensors may be captured using V2V communication, vision sensors, and the like. For example, vision sensors (i.e., cameras) can be used to view the surroundings of the vehicle 105. Image processing subsystem 130 may process the images to identify information about the surroundings. For example, image processing subsystem 130 may process the images such that information about the second vehicle can be detected and classified by classification subsystem 128. For example, image processing subsystem 130 may process the images so that classification subsystem 128 may identify the segment type of vehicle (e.g., a truck, sport utility vehicle, compact car, and the like), a make of vehicle (e.g., FORD®, BUICK®, NISSAN®, and the like), a model of the vehicle (e.g., TAURUS®, F150®, and the like), a power type of the vehicle (e.g., gas, diesel, hybrid, electric, and the like), a park location of the vehicle (e.g., driveway, garage, street, and the like), a duration that the vehicle has been detected (e.g., 6 weeks, 18 months, 3 years, and the like), or a unique identifier for the vehicle such as a license plate number, a VIN number, or the like. Similarly, V2V communication can provide similar information to vehicle 105 that can be processed by metadata processing subsystem 126 and provided to classification subsystem 128 to identify the information about the second vehicle. As one example, components of vehicles have identifiers associated with them, so the combination of four tire pressure sensors may provide a unique identifier of the other vehicle. While described as a single second vehicle to be identified, a household may have many vehicles, and the first vehicle that is obtaining data within the home geofence may identify multiple vehicles, all of which may be classified as described above. Further, neighbor vehicles may also be identified and classified including a classification that the neighboring vehicles belong to the neighboring home.

In some embodiments, it is not straightforward to determine whether a surrounding vehicle should be associated with the household. For example, in multi-tenant housing (e.g., apartment complex), or in areas where driveways and garages are rare and it is common to park in the closest street parking (e.g., inner cities) may make determination that a surrounding vehicle belongs to the same household very difficult. Even determining the home geofence space for a vehicle owned in New York City may be difficult based on sensor data since most individuals there are often lucky to find street parking within half a mile from their home. Accordingly, models for addressing this type of geographical issue may be developed to account for these differing conditions.

In some embodiments, the information obtained is about the household members themselves. For example, when a family member approaches driving age, the likelihood that the household may purchase another vehicle increases. The information about the child's age may be tracked by, for example, sensor data about whether a child restraint is installed in a vehicle and/or vision systems may provide an indication of the age of children. Such information about a possible new driver may be provided to server 110 for marketing subsystem 154 to act on. Further, the addition of a new family member may prompt a household to purchase another vehicle or replace a vehicle with a larger one. The vision systems may capture that a member of the household may have a child soon and transmit that information to marketing subsystem 154 to act on.

In some embodiments, the information about surrounding vehicles may be that they belong to a neighbor of the household of vehicle 105. In such embodiments, information collected on neighboring vehicles may be used to analyze the neighboring vehicle information to determine whether a new or replacement vehicle may be purchased by the neighbor. In such embodiments, satellite imaging, geographic coordinates, reverse lookup, and third party data may be used to identify the home address and household information for the neighbor as well.

In some embodiments, the processed and classified data is transmitted to server 110 (which may be a cloud server) to further process the data and aggregate data about households. In some embodiments, the raw data from sensors 118 is provided to server 110 and all processing and classification may be performed by server 110. In such embodiments, geofence creation and assessment engine 132, image processing subsystem 130, classification subsystem 128 and metadata processing subsystem 126 may be on server 110. In some embodiments, some combination of processing that occurs on vehicle 105 and some processing on server 110 may be performed. Accordingly, the processing, analysis, classification, and so forth can be performed on vehicle 105, server 110, or some combination thereof.

Server 110 includes a transceiver 140, processor 156, and memory 142. Instructions stored within memory 142 may be executed by processor 156 for performing functions described herein. Transceiver 140 may send and receive communications to and from vehicle 105. Transceiver 140 may further transmit and receive data to and from data store 160. Further, server 110 may further include other components, subsystems, or instructions in memory 142 that are left out for simplicity of description of the functionality described herein.

Memory 142 includes vehicle data aggregation subsystem 148, dealership analysis subsystem 146, life-stage analysis subsystem 144, geofence boundary and assessment subsystem 150, third party data collection subsystem 152, and marketing subsystem 154. While specific subsystems are depicted, more or fewer subsystems may be utilized to perform the functionality described herein.

In some embodiments, geofence boundary and assessment subsystem 150 may detect when vehicle 105 is outside or inside the home geofence space, confirm the home geofence space boundaries and adjust them if needed, validate that the home geofence space is still valid for the vehicle 105 (e.g., that the household moved or the vehicle 105 was sold), and the like. Further, server 110 may be accessed by many vehicles 105, so the server 110 may track the status of all vehicles 105 using geofence boundary and assessment subsystem 150.

Vehicle data aggregation subsystem 148 may aggregate data about many vehicles 105. In some embodiments, vehicle data aggregation subsystem 148 may generate a map of homes and associated vehicles 105. The map may be used to identify areas that have large or small amounts of vehicles from the manufacturer and the types of vehicles popular in an area. This information may be used by marketing subsystem 154 to market various vehicles to households that are within that geographic area, for example.

Dealership analysis subsystem 146 may determine whether vehicle 105 is at or going to a dealership and the reason for the visit. For example, the geofence boundary and assessment subsystem 150 may determine that the vehicle 105 is outside the home geofence space. This may be determined by receiving such analysis from vehicle 105 or by making the determination based on vehicle 105 GPS coordinates in combination with the known home geofence space coordinates. When the vehicle 105 is outside the home geofence space, the dealership analysis subsystem 146 may determine whether the vehicle is at or going to a dealership. For example, the user may be navigating to a dealership, so the destination is known. As another example, the location of the vehicle may be known based on GPS information and reverse geocoding may be used to determine that the vehicle is at a dealership. Typically this is of concern when the dealership is not a dealership of the manufacturer using intelligence system 100. If the vehicle 105 is not going to or at a dealership, the server 110 need not do anything further. However, if the vehicle 105 is at a dealership, dealership analysis subsystem 146 may determine the reason for the vehicle visit. For example, sensors 118 may provide information indicating a reason for the dealership visit. Sensors 118 may indicate that the oil level decreases to empty and refills, indicating an oil change, or that the oil change warning indicator is on or resets during the visit to the dealership. Sensors 118 may also indicate the check engine light is illuminated or there is a diagnostic code, indicating that the user may be having service performed on vehicle 105. Sensors 118 may also indicate the tire pressure changes while the vehicle is in the dealership geofence, indicating the owner may be having the tires replaced or serviced. Dealership analysis subsystem 146 may determine the reason for the dealership visit and determine whether this indicates that the owner of vehicle 105 may be shopping at the dealership for a new or replacement vehicle. For example, if there is no indication that service was performed or that there is no issue with the vehicle 105, dealership analysis subsystem 146 may determine the owner is shopping for a new vehicle. If there is an indication that service was performed such as an oil change, tire replacement, diagnostic code issue, or check engine light issue, dealership analysis subsystem 146 may determine the owner is at the dealership only to have maintenance performed and is not shopping for a new vehicle. In some embodiments, after service is performed if the diagnostic code continues or a new one appears, the dealership analysis subsystem may determine that the user is likely to shop for a new vehicle soon. Dealership analysis subsystem 146 may determine that the household/owner may be shopping for a vehicle, and send such information to marketing subsystem 154. If dealership analysis subsystem 146 determines the owner is not shopping for a new vehicle, notification may not be sent.

Life-stage analysis subsystem 144 may utilize the information about vehicle 105 and surrounding vehicles to determine the life-stage of the vehicle 105 and other surrounding vehicles. For example, life-stage analysis subsystem 144 may track for vehicle 105 the age of the vehicle, the condition of the vehicle, the length of ownership of the vehicle by the household, and so forth. Condition of the vehicle can be tracked by determining whether the vehicle has had regular maintenance performed, additional service performed, accidents (indicated for example by deployment of airbags), and the like. The sensors 118 can provide information to life-stage analysis subsystem 144 that indicate whether there are diagnostic codes indicating lifespan issues for vehicle 105 as well. Life-stage analysis subsystem 144 may determine using models for the vehicle type or a rules engine whether the vehicle is nearing the end of its lifecycle. When the vehicle is nearing the end of its lifecycle, this information is sent from life-stage analysis subsystem 144 to marketing subsystem 154.

Life-stage analysis subsystem 144 can similarly determine the life-stage of surrounding vehicles based on information received from vehicle 105 about the surrounding vehicles. For example, raw data or data processed by image processing subsystem 130 and metadata processing subsystem 126 may be provided to server 110 for analysis by life-stage analysis subsystem 144. If the image processing and metadata processing are not performed on vehicle 105, the server 110 may include a metadata processing subsystem 126 and image processing subsystem 130 for processing the data. Life-stage analysis subsystem 144 may analyze the information about the surrounding vehicles including the length of time the vehicle has been owned by the household, whether the vehicle has sustained damage (e.g., dent in door, crumpled bumper, missing taillight, etc.), or the like. If the life-stage analysis subsystem 144 determines that the vehicle is nearing the end of its life cycle, it may determine that the vehicle is to be replaced within a predetermined period of time (e.g., 3 months, six months, or the like). The predetermined period of time may be configured by an administrator, for example. The determination that the vehicle is likely to be replaced within the predetermined period of time is sent from life-stage analysis subsystem 144 to marketing subsystem 154.

Third party data collection subsystem 152 may collect data from various third party sources to include in the analysis performed on server 110. For example, housing information from third party real estate databases including, for example, Zillow®, Redfin®, and the like may be used to identify ownership of a home address.

Marketing subsystem 154 may receive indications from life-stage analysis subsystem 144, dealership analysis subsystem, and vehicle 105 that vehicle 105 may be replaced within a predetermined period of time, another vehicle in the household or a neighboring household may be replaced within the predetermined period of time, and/or that a new vehicle may be purchased for the household or the neighboring household within the predetermined period of time. The predetermined period of time may be configurable by an administrator. The predetermined period of time may be, for example, any reasonable time within the near future (e.g., one month, three months, six months, one year, and the like). Based on such indication, the marketing subsystem 154 may access the data store 160 to identify the associated vehicle information for the household, the family name for the household, the address for the household, and information about the surrounding area for the household to generate targeted marketing information for the household and automatically mail or transmit the material to the leaders of the household. For example, information about the type of vehicle that may be replaced may be used to determine the type of vehicle the user is likely to buy. Additionally, the popular vehicle characteristics in the area (electric, all-wheel drive, trucks, and so forth) that were identified based on mapping the vehicles by vehicle data aggregation subsystem 148 may be used to help target a type of vehicle the user may be likely to purchase. Additionally, the safety ratings of a vehicle may be used to target marketing materials to households looking to purchase a new vehicle due to a new driver or a new family member.

Figure 2:
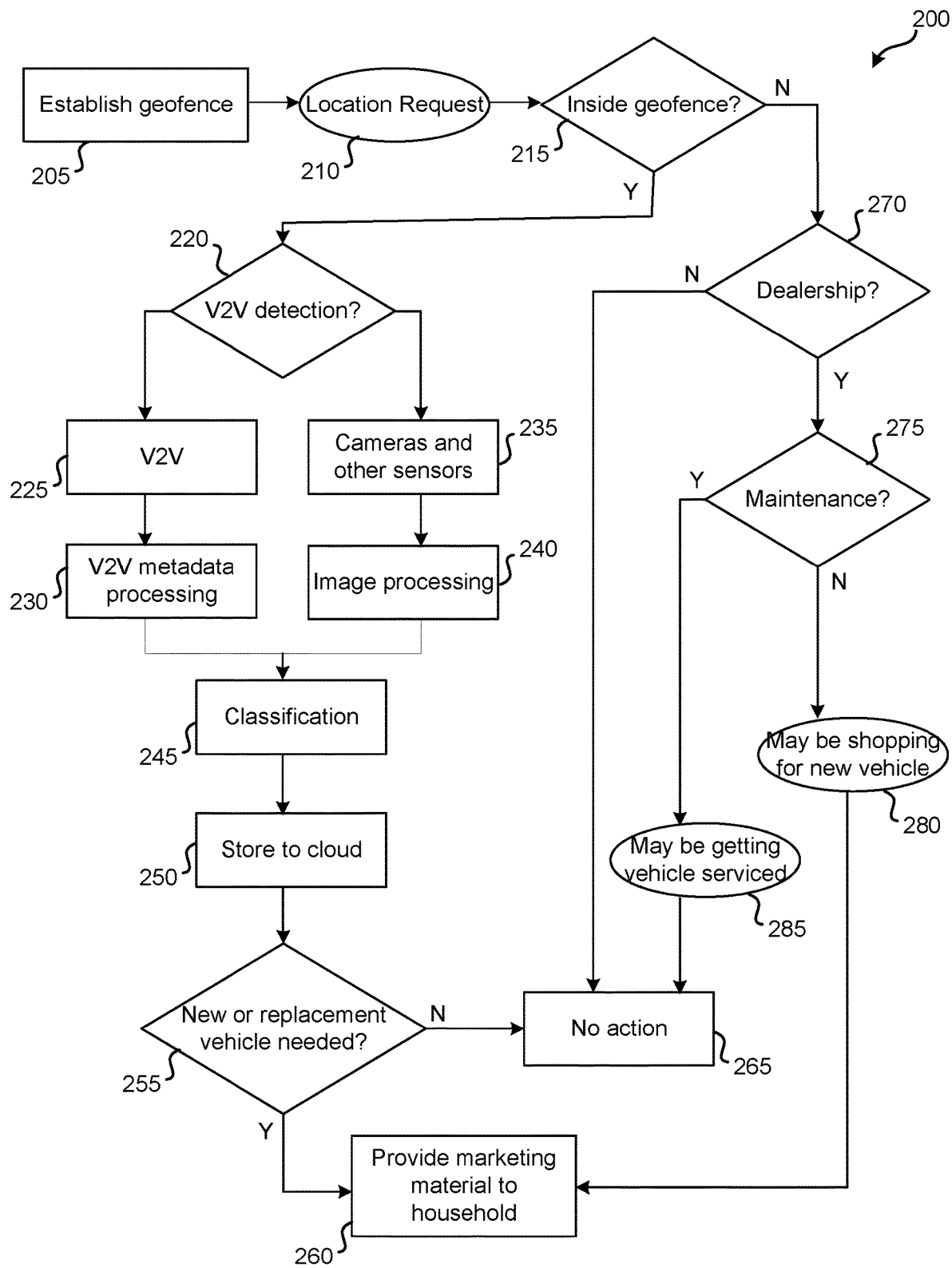
FIG. 2 illustrates a flow diagram, according to some embodiments.

FIG. 2 illustrates a flowchart 200 for how the vehicle 105 and server 110 may operate in intelligence system 100. Flowchart 200 begins at step 205 with the vehicle 105 or server 110 establishing the home geofence space for vehicle 105. For example, geofence creation and assessment engine 132 or geofence boundary and assessment subsystem 150 may establish the home geofence space for vehicle 105.

At step 210, the vehicle 105 or server 110 may make a location request for the location of vehicle 105. The location request may be answered by a GPS of vehicle 105, for example. Using the location information, geofence creation and assessment engine 132 or geofence boundary and assessment subsystem 150 may determine at step 215 whether vehicle 105 is within or outside the home geofence space. If vehicle 105 is within the home geofence space, vehicle 105 may determine whether V2V detection detects surrounding vehicles at step 220.

If vehicle 105 detects another vehicle using V2V communication at step 220, the V2V communication is conducted at step 225 to gather information by vehicle 105 about any surrounding vehicles. For example, transceiver 122 may send and receive information from surrounding vehicles. At step 230, the V2V metadata received from surrounding vehicles is processed to determine information about the nearby vehicle including the make, model, segment, age, condition, and so forth. For example, metadata processing subsystem 126 may process the metadata.

If vehicle 105 does not detect another vehicle using V2V communication at step 220, the other sensors of vehicle 105 are used to capture data about vehicle 105 surroundings at step 235. For example, ADAS cameras of vehicle 105 may be used to capture image data of interior and exterior objects to vehicle 105. At step 240, image processing subsystem 130 may process the captured images.

At step 245 the information from step 230 and/or step 240 are used to classify the any surrounding vehicles. For example, classification subsystem 128 can use the processed image or V2V data to determine the make, model, age, condition, segment, unique identifier, and so forth of the surrounding vehicles. The information and classifications can be stored to the cloud (e.g., data store 160) at step 250.

At step 255 the life-stage analysis subsystem 144 determines whether a new or replacement vehicle is needed by the household or a surrounding household. If not, no action is taken at step 265. If a new or replacement vehicle is indicated, life-stage analysis subsystem 144 may determine a time frame in which the household is likely to purchase or replace the vehicle and determine whether the time frame is less than a predetermined period of time. If the vehicle is to be purchased or replaced within the predetermined period of time, life-stage analysis subsystem 144 provides the indication to the marketing subsystem 154. At step 260 the marketing subsystem 154 can generate and provide marketing material to the household.

Returning to the decision block 215, if the vehicle 105 is determined to be outside the geofence, the dealership analysis subsystem 146 may determine whether vehicle 105 is going to or at a dealership. If the vehicle 105 is not at or destined to arrive at a dealership, no action is taken at step 265. If the vehicle 105 is at or going to a dealership, the dealership analysis subsystem 146 determines whether the vehicle 105 is at the dealership for maintenance at step 275. If the vehicle 105 has no indication that it is having service performed (no low tire pressure, no oil change needed or indicated, no diagnostic codes) then the dealership analysis subsystem 146 may determine that the owner may be shopping for a new vehicle at step 280. At step 260 the marketing subsystem 130 may provide targeted marketing material to the household associated with vehicle 105. If the dealership analysis subsystem 146 determines the vehicle 105 is at the dealership for maintenance, the dealership analysis subsystem 146 may determine the vehicle is getting serviced at step 285 and no action is taken at step 265.

FIG. 3 illustrates an example household geographic area 300. The household geographic area 300 includes a house 315 with a garage 310. Vehicle 105 may be part of household associated with the house address of house 315. Vehicle 320 may also be a household vehicle associated with the same household. The home geofence space 305 may be identified by geofence creation and assessment engine 132 or geofence boundary and assessment subsystem 150 or some combination thereof. For example, sensor data or other information about vehicle 105 may be used to identify the home address of house 315 and behavior pattern matching may be used to associate vehicle 105 with house 315. Satellite imaging may be used to identify the garage 310, and the coordinates of such location may be used to generate the home geofence space 305. In some embodiments, the home geofence space may extend to the middle of the road as shown or to the opposite side of the road. In some embodiments, the area of the street in front of the home is included in the home geofence area as shown. In some embodiments, when multi-tenant housing is identified, a typical or assigned parking space or spaces may be identified as the home geofence space.

Figure 4:
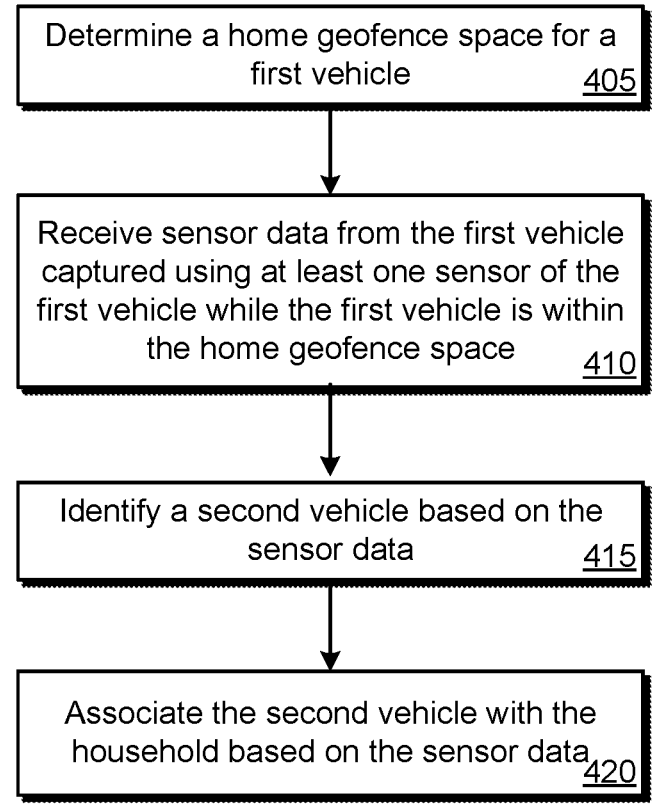
FIGS. 4 and 5 illustrate methods, according to some embodiments.

FIG. 4 illustrates a method 400 used to gather intelligence according to some embodiments. Method 400 may be performed by, for example, intelligence system 100 including vehicle 105 and server 110 as described with respect to FIG. 1. At step 405, a home geofence space is determined for a first vehicle. For example, the home geofence space for vehicle 105 is identified. As described with respect to FIG. 1, the home geofence space may be identified based on known address of the purchaser of vehicle 105, sensor information gathered from vehicle 105, and the like. The home geofence space may be determined by geofence creation and assessment engine 132, geofence boundary and assessment subsystem 150, or some combination thereof.

At step 410, sensor data captured by the first vehicle when the first vehicle is within the home geofence space is received. For example, sensor data collection subsystem 134 may receive the sensor data. In some embodiments, the raw sensor data may be provided to server 110 and processed by a subsystem on server 110 similar to sensor data collection subsystem 134.

At step 415, a second vehicle is identified based on the sensor data. For example, image processing subsystem 130 and/or metadata processing subsystem 126 may process image data from vision sensors of the first vehicle and/or V2V metadata, respectively, which can be classified by classification subsystem 128 to identify another vehicle, information about the other vehicle (make, model, age, parking behavior at the home geofence space, and the like) to identify the second vehicle. In some embodiment, other additional vehicles are identified based on the sensor data from the first vehicle. For example, a household may have multiple vehicles, and the first vehicle may detect each of them.

At step 420, the second vehicle can be associated with the household based on the sensor data by classification subsystem 128. For example, sensor data that indicates whether the second vehicle is within the home geofence space and whether the pattern of behavior matches or corresponds to a pattern of home parking behavior to identify the second vehicle as another household vehicle that should be associated in data store 160 with the household and vehicle 105.

Figure 5:
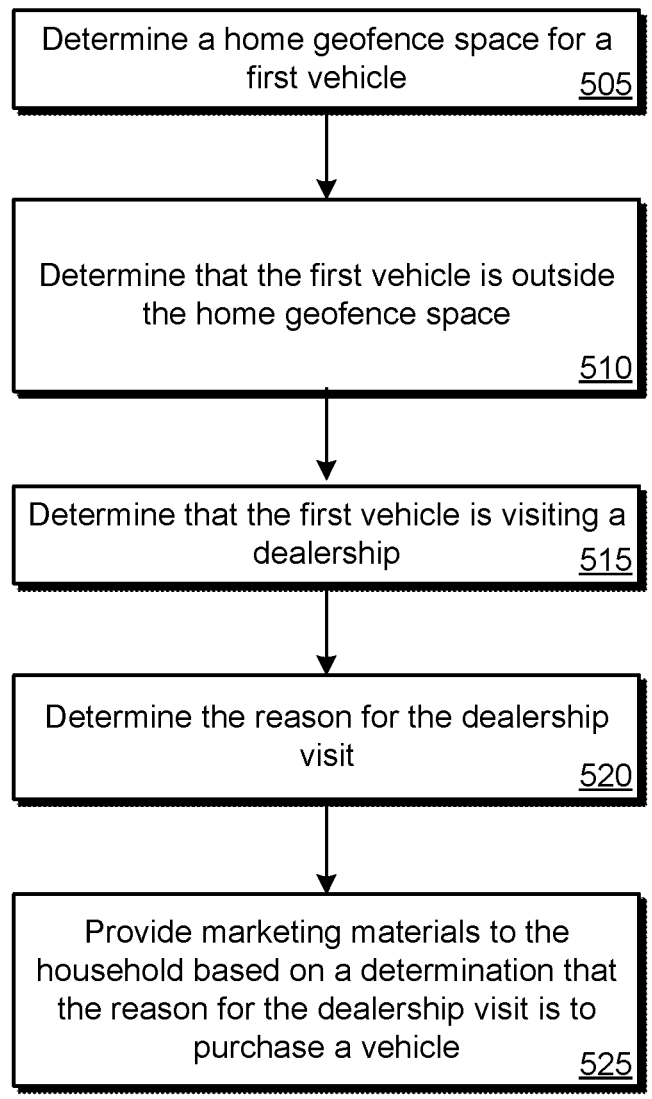

FIG. 5 illustrates a method 500 used to gather vehicle intelligence according to some embodiments. Method 500 may be performed by, for example, intelligence system 100 including vehicle 105 and server 110 as described with respect to FIG. 1. Additionally, method 500 may be performed in combination with method 400 as shown in flowchart 200. At step 505, a home geofence space is determined for a first vehicle. For example, the home geofence space for vehicle 105 is identified. As described with respect to FIG. 1, the home geofence space may be identified based on known address of the purchaser of vehicle 105, sensor information gathered from vehicle 105, and the like. The home geofence space may be determined by geofence creation and assessment engine 132, geofence boundary and assessment subsystem 150, or some combination thereof.

At step 510, a determination is made that the first vehicle is outside the home geofence space. For example, geofence creation and assessment engine 132 or geofence boundary and assessment subsystem 150 may determine that vehicle 105 is not within the home geofence space.

At step 515, based on the determination that the first vehicle is not within the home geofence space, the decision as to whether the first vehicle is at or going to a dealership is made. At step 515, it is determined that the first vehicle is visiting a dealership by, for example, dealership analysis subsystem 146.

At step 520, dealership analysis subsystem 146 can determine the reason for the dealership visit. For example, sensor 118 data from vehicle 105 may indicate that the oil is being changed or needs to be changed, tire pressure is low, or some other diagnostic code that indicates a vehicle maintenance or servicing issue may be present and determined to be the the reason for visiting the dealership. As another example, there may be no indications that there is a vehicle issue, indicating that the reason for visiting the dealership is to shop for a new vehicle.

At step 525, the marketing subsystem 154 generates and provides marketing materials to the household based on a determination that the reason for the dealership visit is to purchase a vehicle. As described above, marketing subsystem 154 may use information about the household members, geographic location of the household, and the like to target the materials for the household.

Examples of Computing Environments for Implementing Certain Embodiments

Figure 6:
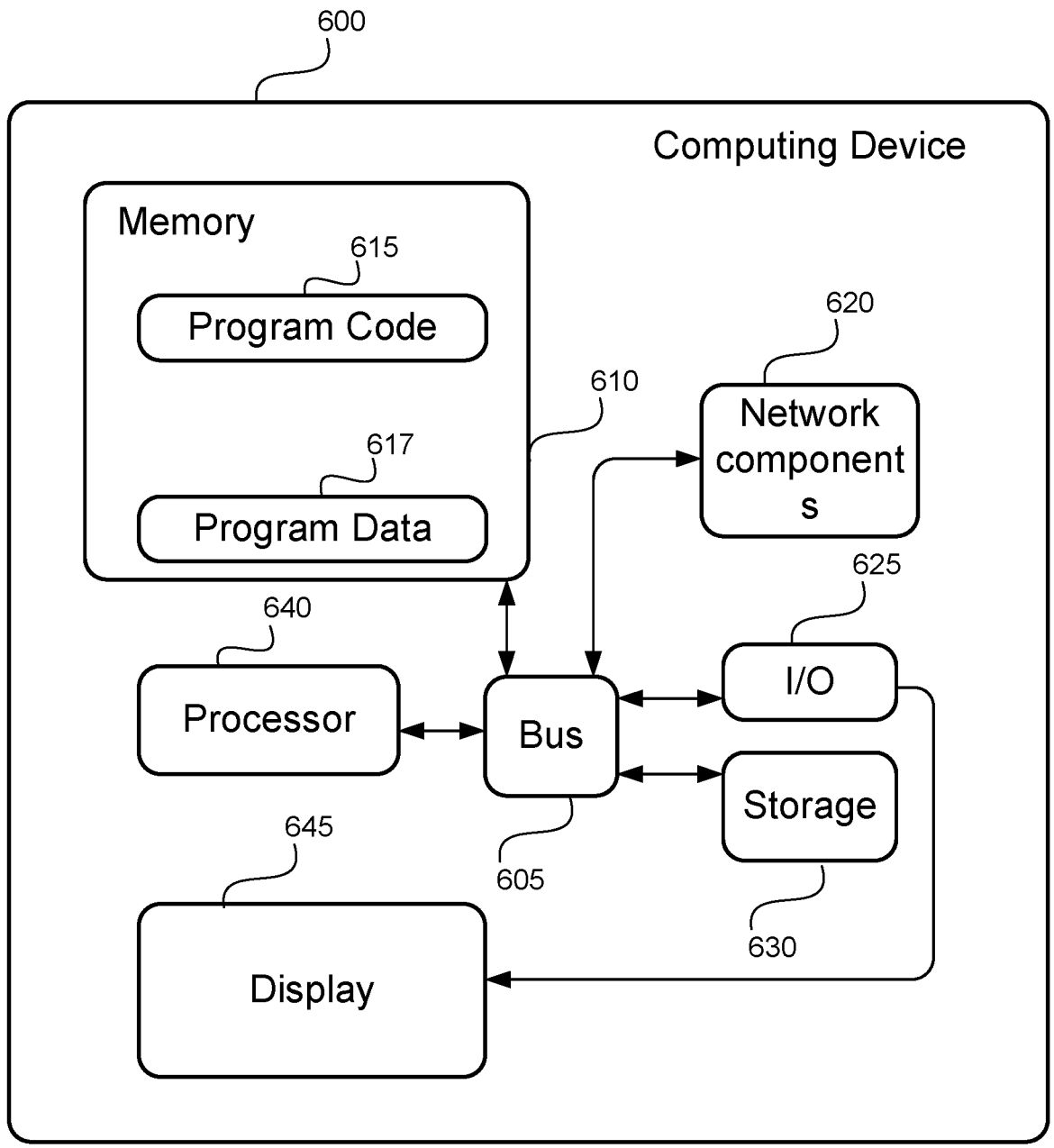
FIG. 6 illustrates a computer system, according to some embodiments.
Figure 7:
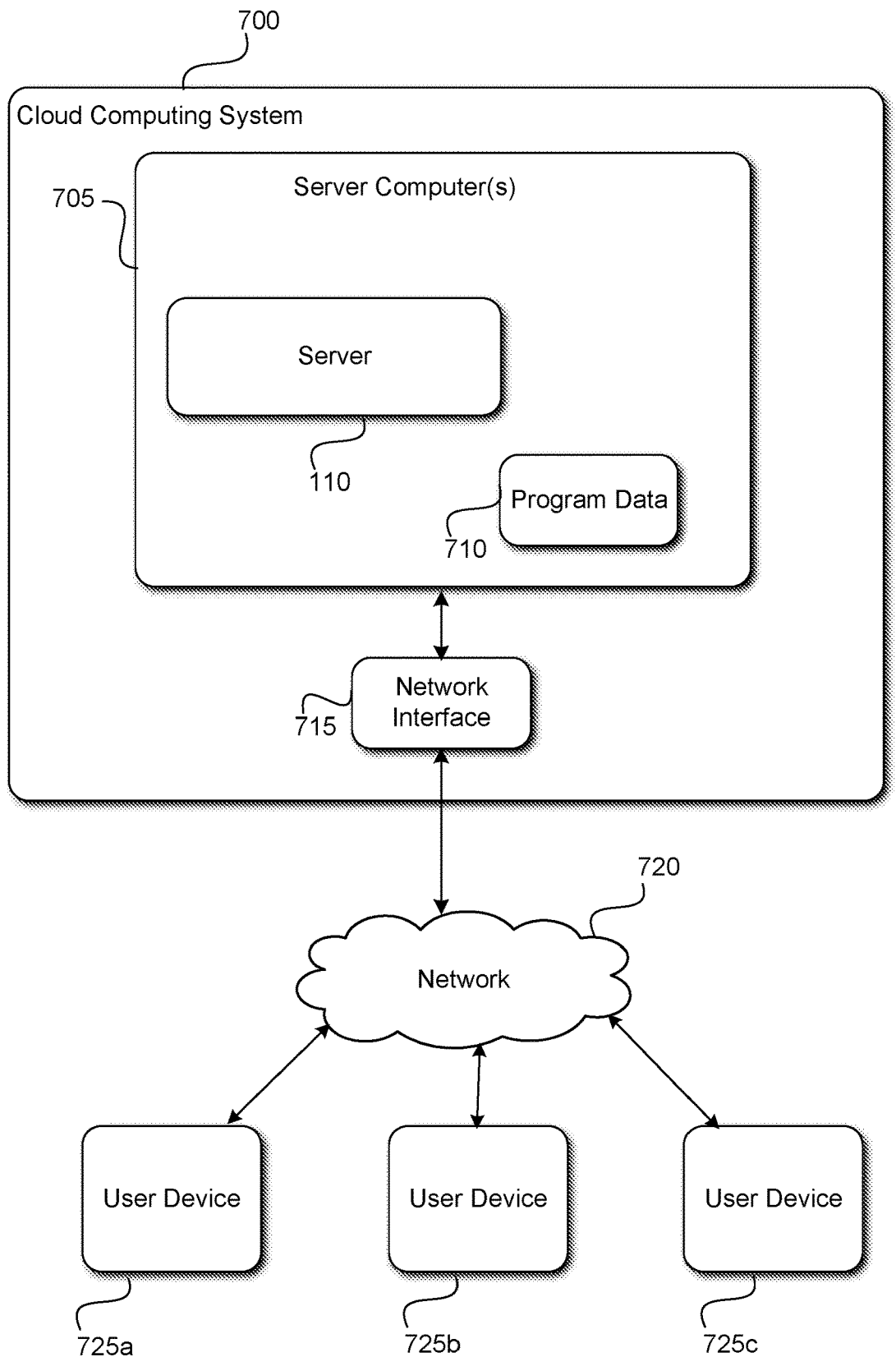
FIG. 7 illustrates a cloud computing system, according to some embodiments.

Any suitable computing system or group of computing systems can be used for performing the operations described herein. For example, FIG. 7 illustrates a cloud computing system 700 by which at least a portion of the functionality of server 110 may be offered. FIG. 6 depicts an example of a computing device 600 that may be at least a portion of vehicle 105 and/or server 110. The implementation of the computing device 600 could be used for one or more of the subsystems depicted in FIG. 1. In an embodiment, a single vehicle 105 or server 110 having devices similar to those depicted in FIG. 6 (e.g., a processor, a memory, etc.) combines the one or more operations and data stores depicted as separate subsystems in FIG. 1.

FIG. 6 illustrates a block diagram of an example of a computer system 600. Computer system 600 can be any of the described computers herein including, for example, server 110 or a computer within vehicle 105. The computing device 600 can be or include, for example, an integrated computer, a laptop computer, desktop computer, tablet, server, or other electronic device.

The computing device 600 can include a processor 640 interfaced with other hardware via a bus 605. A memory 610, which can include any suitable tangible (and non-transitory) computer readable medium, such as RAM, ROM, EEPROM, or the like, can embody program components (e.g., program code 615) that configure operation of the computing device 600. Memory 610 can store the program code 615, program data 617, or both. In some examples, the computing device 600 can include input/output ("I/O") interface components 625 (e.g., for interfacing with a display 645, keyboard, mouse, and the like) and additional storage 630.

The computing device 600 executes program code 615 that configures the processor 640 to perform one or more of the operations described herein. Examples of the program code 615 include, in various embodiments, sensor data collection subsystem 134, geofence creation and assessment engine 132, image processing subsystem 130, classification subsystem 128, metadata processing subsystem 126, vehicle data aggregation subsystem 148, dealership analysis subsystem 146, life-stage analysis subsystem 144, geofence boundary and assessment subsystem 150, third party data collection subsystem 148, marketing subsystem 154, or any other suitable systems or subsystems that perform one or more operations described herein (e.g., one or more development systems for configuring an interactive user interface). The program code 615 may be resident in the memory 610 or any suitable computer-readable medium and may be executed by the processor 640 or any other suitable processor.

The computing device 600 may generate or receive program data 617 by virtue of executing the program code 615. For example, sensor data, classification data, and V2V metadata are all examples of program data 617 that may be used by the computing device 600 during execution of the program code 615.

The computing device 600 can include network components 620. Network components 620 can represent one or more of any components that facilitate a network connection. In some examples, the network components 620 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 620 can be wired and can include interfaces such as Ethernet, USB, or IEEE 1394.

Although FIG. 6 depicts a single computing device 600 with a single processor 640, the system can include any number of computing devices 600 and any number of processors 640. For example, multiple computing devices 600 or multiple processors 640 can be distributed over a wired or wireless network (e.g., a Wide Area Network, Local Area Network, or the Internet). The multiple computing devices 600 or multiple processors 640 can perform any of the steps of the present disclosure individually or in coordination with one another.

In some embodiments, the functionality provided by the intelligence system 100 may be offered as cloud services by a cloud service provider. For example, FIG. 7 depicts an example of a cloud computing system 700 offering an intelligence service that can be used by a number of user subscribers using user devices 725a, 725b, and 725c across a data network 720. User devices 725a, 725b, and 725c could be examples of a vehicle 105 described above. In the example, the intelligence service may be offered under a Software as a Service (SaaS) model. One or more users may subscribe to the intelligence service, and the cloud computing system performs the processing to provide the intelligence service to subscribers. The cloud computing system may include one or more remote server computers 705.

The remote server computers 705 include any suitable non-transitory computer-readable medium for storing program code (e.g., server 110) and program data 710, or both, which is used by the cloud computing system 700 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 705 can include volatile memory, non-volatile memory, or a combination thereof.

One or more of the servers 705 execute the program code 710 that configures one or more processors of the server computers 705 to perform one or more of the operations that provide intelligence services, including the ability to utilize the dealership analysis subsystem 146, the life-stage analysis subsystem 144, and so forth, to perform intelligence services. As depicted in the embodiment in FIG. 7, the one or more servers 705 provide the services to perform intelligence services via the server 110. Any other suitable systems or subsystems that perform one or more operations described herein (e.g., one or more development systems for configuring an interactive user interface) can also be implemented by the cloud computing system 700.

In certain embodiments, the cloud computing system 700 may implement the services by executing program code and/or using program data 710, which may be resident in a memory device of the server computers 705 or any suitable computer-readable medium and may be executed by the processors of the server computers 705 or any other suitable processor.

In some embodiments, the program data 710 includes one or more datasets and models described herein. Examples of these datasets include dealership data, classification data, etc. In some embodiments, one or more of data sets, models, and functions are stored in the same memory device. In additional or alternative embodiments, one or more of the programs, data sets, models, and functions described herein are stored in different memory devices accessible via the data network 715.

The cloud computing system 700 also includes a network interface device 715 that enable communications to and from cloud computing system 700. In certain embodiments, the network interface device 715 includes any device or group of devices suitable for establishing a wired or wireless data connection to the data networks 720. Non-limiting examples of the network interface device 715 include an Ethernet network adapter, a modem, and/or the like. The server 110 is able to communicate with the user devices 725a, 725b, and 725c via the data network 720 using the network interface device 715.

GENERAL CONSIDERATIONS

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A method, comprising:
   determining, by a computer system, a home geofence space for a first vehicle, wherein the home geofence space and the first vehicle are associated with a household;
   receiving, at the computer system, sensor data from the first vehicle captured using at least one vision sensor of the first vehicle while the first vehicle is within the home geofence space;
   identifying, at the computer system, a second vehicle based on the sensor data;
   associating, by the computer system, the second vehicle with the household based on the sensor data;
   identifying, based on the sensor data, an indication that the second vehicle needs replacement within a predetermined period of time; and
   providing, to the household, marketing materials for the replacement of the second vehicle.

2. The method of claim 1, wherein the at least one vision sensor of the first vehicle comprises a transceiver communicating with the second vehicle using vehicle-to-vehicle communication.

3. The method of claim 1, wherein associating the second vehicle with the household comprises:
determining that the second vehicle belongs to the household based on at least one of a length of time the second vehicle was detected within the home geofence space, a time of day the second vehicle was detected within the home geofence space, or a number of occurrences that the second vehicle was detected within the home geofence space during a predetermined period of time.

4. The method of claim 1, wherein determining the home geofence space comprises:
detecting a location of the first vehicle using a global positioning system of the first vehicle in a pattern that corresponds to a home location pattern.

5. The method of claim 1, wherein the home geofence space is determined using satellite images to map the home geofence space to include a driveway of a home address of the household.

6. The method of claim 1, wherein the home geofence space is determined based at least in part on parking usage in a geographic region of the home geofence space.

7. The method of claim 1, further comprising:
determining, using the sensor data, at least one of a make of the second vehicle, a model of the second vehicle, a condition of the second vehicle, or a unique identifier of the second vehicle.

8. A system, comprising:
one or more processors; and
a memory having stored thereon instructions that, when executed by the one or more processors, cause the one or more processors to:
determine a home geofence space for a first vehicle, wherein the home geofence space and the first vehicle are associated with a household;
receive sensor data from the first vehicle captured using at least one vision sensor of the first vehicle while the first vehicle is within the home geofence space;
identify a second vehicle based on the sensor data;
associate the second vehicle with the household based on the sensor data;
identify, based on the sensor data, an indication that the second vehicle needs replacement within a predetermined period of time; and
provide, to the household, marketing materials for the replacement of the second vehicle.

9. The system of claim 8, wherein the at least one vision sensor of the first vehicle comprises a transceiver communicating with the second vehicle using vehicle-to-vehicle communication.

10. The system of claim 8, wherein the instructions to associate the second vehicle with the household comprises further instructions that, when executed by the one or more processors, cause the one or more processors to:
determine that the second vehicle belongs to the household based on at least one of a length of time the second vehicle was detected within the home geofence space, a time of day the second vehicle was detected within the home geofence space, or a number of occurrences that the second vehicle was detected within the home geofence space during a predetermined period of time.

11. The system of claim 8, wherein the instructions to determine the home geofence space comprises further instructions that, when executed by the one or more processors, cause the one or more processors to:
detect a location of the first vehicle using a global positioning system of the first vehicle in a pattern that corresponds to a home location pattern.

12. The system of claim 8, wherein the home geofence space is determined using satellite images to map the home geofence space to include a driveway of a home address of the household.

13. The system of claim 8, wherein the home geofence space is determined based at least in part on parking usage in a geographic region of the home geofence space.

14. The system of claim 8, wherein the instructions comprise further instructions that, when executed by the one or more processors, cause the one or more processors to:
determine, using the sensor data, at least one of a make of the second vehicle, a model of the second vehicle, a condition of the second vehicle, or a unique identifier of the second vehicle.

15. A non-transitory, computer-readable medium comprising instructions that, when executed by one or more processors, cause the one or more processors to:
determine a home geofence space for a first vehicle, wherein the home geofence space and the first vehicle are associated with a household;
receive sensor data from the first vehicle captured using at least one vision sensor of the first vehicle while the first vehicle is within the home geofence space;
identify a second vehicle based on the sensor data;
associate the second vehicle with the household based on the sensor data;
identify an indication based on the sensor data that the second vehicle needs replacement within a predetermined period of time; and
provide marketing materials to the household for the replacement of the second vehicle.

16. The non-transitory, computer-readable medium of claim 15, wherein the instructions to associate the second vehicle with the household comprises further instructions that, when executed by the one or more processors, cause the one or more processors to:
determine that the second vehicle belongs to the household based on at least one of a length of time the second vehicle was detected within the home geofence space, a time of day the second vehicle was detected within the home geofence space, or a number of occurrences that the second vehicle was detected within the home geofence space during a predetermined period of time.

* * * * *